United States Patent
Xiao et al.

(10) Patent No.: US 8,081,444 B2
(45) Date of Patent: Dec. 20, 2011

(54) COMPUTER SYSTEM WITH AIRFLOW GUIDING DUCT

(75) Inventors: Bo Xiao, Shenzhen (CN); Xiang-Kun Zeng, Shenzhen (CN); Zhi-Guo Zhang, Shenzhen (CN); Li-Fu Xu, Shenzhen (CN)

(73) Assignees: Hong Fu Jin Precision Industry (Wuhan) Co., Ltd., Wuhan, Hubei Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 7 days.

(21) Appl. No.: 12/697,219

(22) Filed: Jan. 30, 2010

(65) Prior Publication Data

US 2011/0085298 A1 Apr. 14, 2011

(30) Foreign Application Priority Data

Oct. 14, 2009 (CN) .................. 2009 2 0312481 U

(51) Int. Cl.
 *H05K 5/00* (2006.01)
 *H05K 7/20* (2006.01)
 *G06F 1/20* (2006.01)
 *A47B 81/00* (2006.01)
(52) U.S. Cl. .......... 361/679.49; 361/692; 361/679.51; 361/695; 361/719; 361/752; 454/184; 312/223.2
(58) Field of Classification Search .......... 361/692, 361/679.49, 679.51, 695, 719, 752; 454/184; 312/223.2
See application file for complete search history.

(56) References Cited

U.S. PATENT DOCUMENTS

| | | | | |
|---|---|---|---|---|
| 5,136,468 A | * | 8/1992 | Wong et al. | 361/679.6 |
| 5,218,514 A | * | 6/1993 | Huynh et al. | 361/679.47 |
| 5,224,019 A | * | 6/1993 | Wong et al. | 361/679.37 |
| 5,375,038 A | * | 12/1994 | Hardt | 361/694 |
| 5,438,476 A | * | 8/1995 | Steffes | 361/679.32 |
| 5,493,457 A | * | 2/1996 | Kawamura et al. | 720/648 |
| 5,523,917 A | * | 6/1996 | Searby | 361/679.48 |
| 5,596,483 A | * | 1/1997 | Wyler | 361/679.47 |
| 5,734,551 A | * | 3/1998 | Hileman et al. | 361/695 |
| 5,835,346 A | * | 11/1998 | Albani et al. | 361/679.4 |
| 5,852,547 A | * | 12/1998 | Kitlas et al. | 361/695 |
| 5,963,424 A | * | 10/1999 | Hileman et al. | 361/695 |
| 6,324,056 B1 | * | 11/2001 | Breier et al. | 361/679.46 |
| 6,377,455 B1 | * | 4/2002 | Nelik | 361/679.46 |
| 6,400,568 B1 | * | 6/2002 | Kim et al. | 361/697 |
| 6,504,718 B2 | * | 1/2003 | Wu | 361/695 |
| 6,618,248 B1 | * | 9/2003 | Dalheimer | 361/679.33 |
| 6,951,446 B2 | * | 10/2005 | Hung | 415/213.1 |
| 7,061,761 B2 | * | 6/2006 | Tucker et al. | 361/695 |
| 7,120,017 B2 | * | 10/2006 | Shieh | 361/695 |
| 7,256,993 B2 | * | 8/2007 | Cravens et al. | 361/690 |
| 7,289,323 B2 | * | 10/2007 | Chang et al. | 361/695 |

(Continued)

*Primary Examiner* — Bradley H Thomas
(74) *Attorney, Agent, or Firm* — Altis Law Group, Inc.

(57) ABSTRACT

A computer system includes a chassis and an airflow guiding duct. The chassis includes a chassis bottom wall, a chassis front wall and a chassis rear wall. The chassis front wall defines a first ventilation hole, and the chassis rear wall defines a second ventilation hole. A motherboard is secured to the chassis bottom wall between the chassis front wall and the chassis rear wall. A memory card is secured to the motherboard. The airflow guiding duct is secured in the chassis and includes an entrance portion. The entrance portion covers a portion of the memory card, so as to guide airflow. Airflow flows in the chassis via the first ventilation hole, over the memory card, and then out of the chassis via the second ventilation hole.

18 Claims, 3 Drawing Sheets

U.S. PATENT DOCUMENTS

| | | | |
|---|---|---|---|
| 7,310,228 B2 * | 12/2007 | Chen | 361/695 |
| 7,324,338 B1 * | 1/2008 | Chi et al. | 361/695 |
| 7,403,387 B2 * | 7/2008 | Pav et al. | 361/694 |
| 7,643,292 B1 * | 1/2010 | Chen | 361/695 |
| 2002/0134531 A1 * | 9/2002 | Yanagida | 165/80.3 |
| 2003/0156385 A1 * | 8/2003 | Askeland et al. | 361/687 |
| 2004/0004812 A1 * | 1/2004 | Curlee et al. | 361/687 |
| 2004/0095723 A1 * | 5/2004 | Tsai et al. | 361/695 |
| 2005/0168940 A1 * | 8/2005 | Askeland et al. | 361/687 |
| 2007/0097634 A1 * | 5/2007 | Chang | 361/695 |
| 2008/0144281 A1 * | 6/2008 | Chen et al. | 361/695 |
| 2008/0174949 A1 * | 7/2008 | Lai et al. | 361/685 |
| 2008/0180905 A1 * | 7/2008 | Peng et al. | 361/687 |
| 2008/0232066 A1 * | 9/2008 | Wu et al. | 361/690 |
| 2009/0034190 A1 * | 2/2009 | Tsai et al. | 361/695 |
| 2009/0040717 A1 * | 2/2009 | Liu | 361/695 |
| 2009/0059516 A1 * | 3/2009 | Lai et al. | 361/687 |
| 2011/0013356 A1 * | 1/2011 | Wang | 361/679.33 |
| 2011/0043996 A1 * | 2/2011 | Chen et al. | 361/679.58 |

* cited by examiner

COMPUTER SYSTEM WITH AIRFLOW GUIDING DUCT

BACKGROUND

1. Technical Field

The present disclosure relates to a computer system with an airflow guiding duct.

2. Description of Related Art

A heat sink is secured to a motherboard of a computer system to dissipate heat generated from a CPU. The memory cards also generate heat. The heat generated from the memory cards is usually cooled by the heat dissipating component of the CPU. However, if a higher heat is generated from the memory card, the heat dissipation component for the CPU often cannot effectively cool the memory cards.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
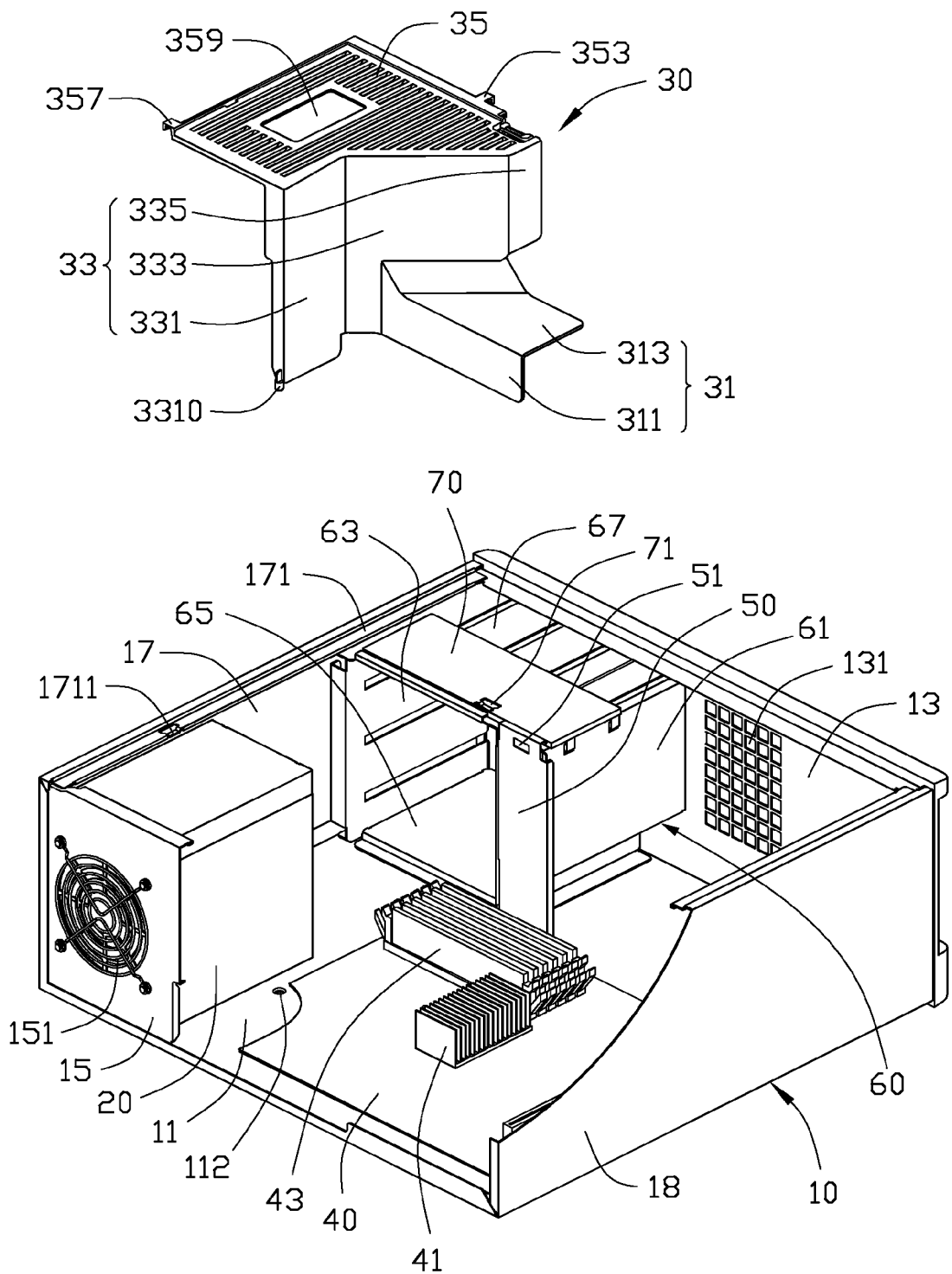
FIG. 1 is an exploded, isometric, partial view of a computer system in accordance with an embodiment.

Referring to FIG. 1, a computer system in accordance with an embodiment includes a chassis 10, a motherboard 40, a power supply bracket 20, a drive bracket 60, and an airflow guiding duct 30.

The chassis 10 includes a chassis bottom wall 11, a chassis front wall 13, a chassis rear wall 15 (only part shown in FIG. 1), a chassis left wall 17, and a chassis right wall 18. The chassis front wall 13 is parallel to the chassis rear wall 15 and perpendicular to the chassis bottom wall 11. The chassis left wall 17 is parallel to the chassis right wall 18, and perpendicular to the chassis bottom wall 11 and the chassis front wall 13. The screw hole 112 is defined in the chassis bottom wall 11. A plurality of first ventilation holes 131 is defined in the chassis front wall 13. In one embodiment, the first ventilation holes 131 are arranged in a rectangle area. A plurality of second ventilation holes 151 is defined in the chassis rear wall 15. In one embodiment, the second ventilation holes 151 are arranged in a circular area. A flange 171 is bent inward from a top edge of the chassis left wall 17. A flange hole 1711 is defined in the flange 171 adjacent the chassis rear wall 15.

The power supply bracket 20 is secured in the chassis 10 at a first corner between the chassis rear wall 15 and the chassis left wall 17. Airflow passes through the power supply bracket 20 and out the second ventilation holes 151.

The motherboard 40 is mounted on the chassis bottom wall 11 between the power supply bracket 15 and the chassis right wall 18. The screw hole 112 is positioned between the power supply bracket 20 and the motherboard 40. A heat sink 41 is mounted on the motherboard 40 for dissipating heat generated from a CPU. A plurality of memory cards 43 is secured to the motherboard 40 adjacent the heat sink 41.

The drive bracket 60 is secured in the chassis 10 at a second corner between the chassis front wall 13 and the chassis left wall 17. The first ventilation holes 131 are defined in the chassis front wall 13 between the drive bracket 60 and the chassis right wall 18. The drive bracket 60 includes a drive bracket right wall 61, a drive bracket left wall 63 parallel to the drive bracket right wall 61, a drive bracket bottom wall 65 perpendicular to the drive bracket right wall 61, and a drive bracket top wall 67 parallel to the drive bracket bottom wall 65. A securing component 70 is fixed on an outer surface of the drive bracket top wall 67, configured for securing disk drives (not shown) in the drive bracket 60. The securing component 70 is substantially perpendicular to the chassis bottom wall 11, and defines a securing hole 71 adjacent a rear edge thereof. A locking component 50 is secured on the drive bracket 60 and the securing member 70, and it is substantially parallel to the chassis front wall 13. The locking component 50 defines a locking hole 51 adjacent a top edge thereof.

Figure 2:
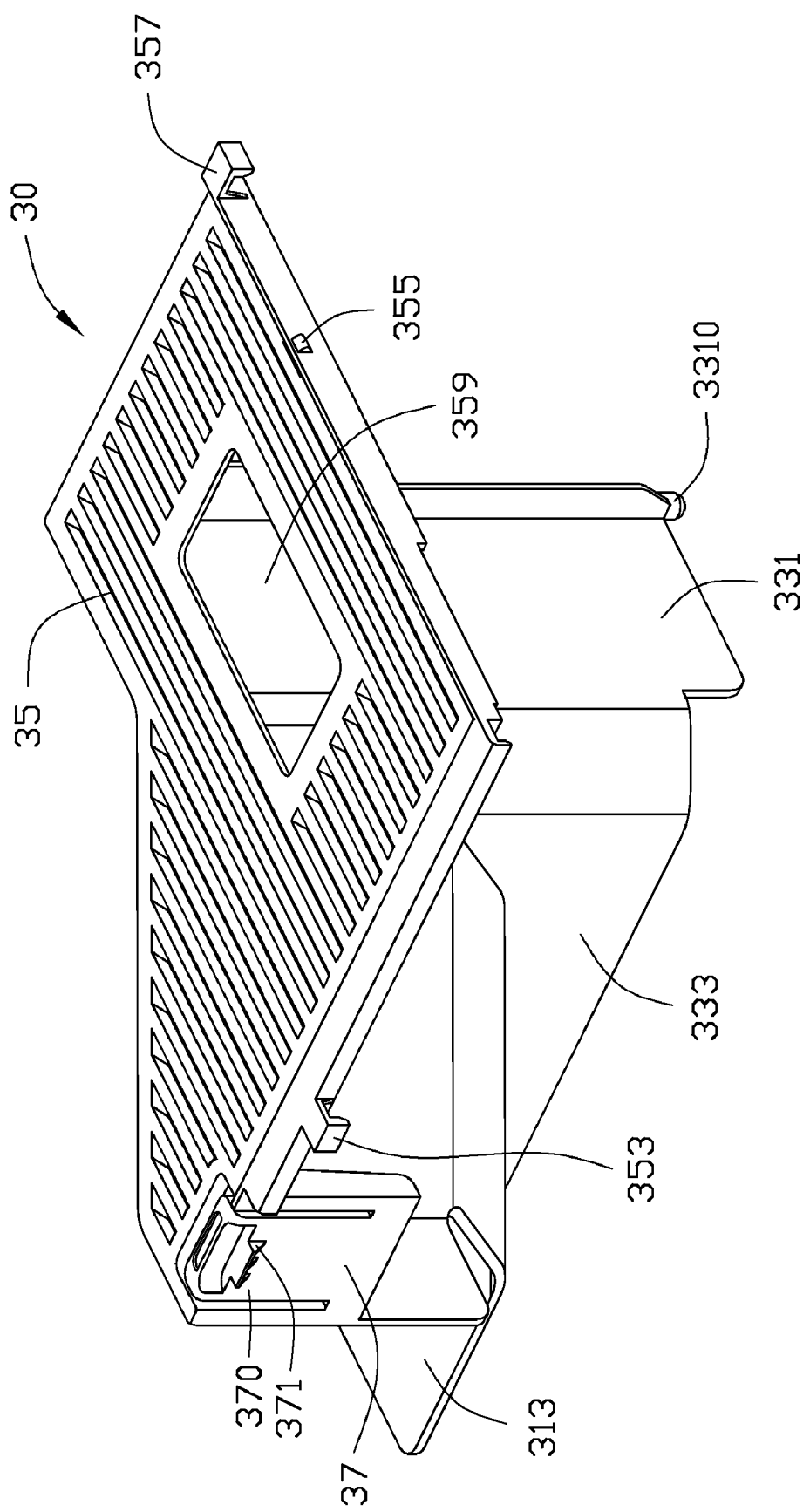
FIG. 2 is another isometric view of an airflow guiding duct of the computer system of FIG. 1.

Referring also to FIG. 2, the airflow guiding duct 30 includes a duct top wall 35, a duct sidewall 33, and an entrance portion 31 connected to the duct sidewall 33. The duct sidewall 33 includes a first vertical wall 331, a second vertical wall 333, and a third vertical wall 335. A through opening 359 is defined in the duct top wall 35. A first hook 353 is located on a front edge of the duct top wall 35, for engaging in the securing hole 71 of the securing component 70. A retaining portion 37 is located on the right edge of the duct top wall 35, and is connected to the third vertical wall 335. A resiliently deformable latch 370 with a retaining tab 371 is located on the retaining portion 37, and the retaining tab 371 is configured for engaging in the locking hole 51 of the locking component 50. A second hook 357 is located on a left edge of the duct top wall 35, for engaging in the flange hole 1711 of the flange 17, and a positioning tab 355 is located the left edge of the duct top wall 35, for engaging with the flange 17. A fixing pin 3310 extends down from the bottom end of the first vertical wall 331, for engaging in the screw hole 112 of the chassis bottom wall 11. The second vertical wall 333 connects the first vertical wall 331 and the third vertical wall 335. The entrance portion 31 includes an entrance vertical wall 311 and an entrance horizontal wall 313.

Figure 3:
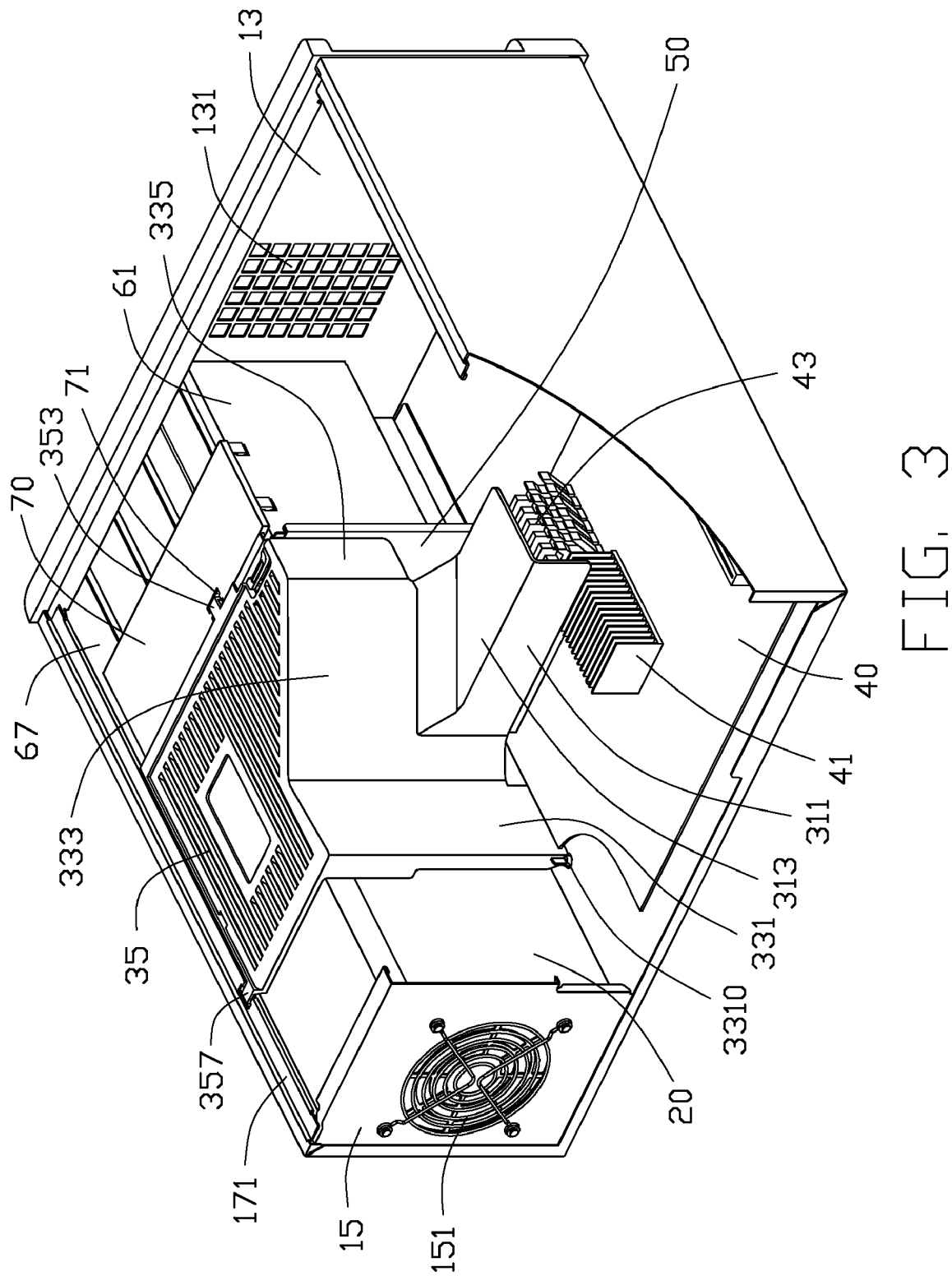
FIG. 3 is an assembled view of the computer system of FIG. 1.

Referring also to FIG. 3, in assembly, the airflow guiding duct 30 is placed in the chassis 10. The duct top wall 35 is located on a top wall of the power supply 20. The first hook 353 is engaged in the securing hole 71 of the securing component 70. The retaining tab 371 is engaged in the locking hole 51 of the locking component 50. The second hook 357 is engaged in the flange hole 1711 of the flange 17. The positioning tab 355 is engaged with and positioned below the flange 17. The first vertical wall 331 abuts a sidewall of the power supply bracket 20, and the third vertical wall 335 abuts the locking component 50. The fixing pin 3310 is engaged in the screw hole 112 of the chassis bottom wall 11 of the chassis 10. The entrance portion 31 covers top portions of the memory cards 43, and extends over a portion of the heat sink 41. The entrance horizontal wall 313 is positioned above the memory cards 43, and the entrance vertical wall 311 is positioned at one side of the memory cards 43 and is substantially parallel to the chassis front wall 13. The entrance horizontal wall 313 is positioned between the entrance vertical wall 311 and the chassis front wall 13.

In use, airflow flows in the chassis 10 via the first ventilation holes 131 of the chassis front wall 13 and towards the memory cards 43. Part of the airflow is guided by the entrance portion 31 to flow over the memory cards 43, and flows in a space defined among the airflow guiding duct 30, the disk drive bracket 60 and the power supply bracket 20. Air then passes through the power supply bracket 20 and flows out of the chassis 10 via the second ventilation holes 151. With the airflow guiding duct 30, heat generated from the memory cards 43 can be effectively removed.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer system comprising:
a chassis comprising a chassis bottom wall, a chassis front wall and a chassis rear wall; the chassis front wall defining a first ventilation hole, and the chassis rear wall defining a second ventilation hole; a motherboard secured to the chassis bottom wall between the chassis front wall and the chassis rear wall; a memory card secured to the motherboard; a power supply bracket secured to the rear wall; and a locking component located in the chassis and perpendicular to the chassis bottom wall, and a locking hole defined in the locking component; and
an airflow guiding duct secured in the chassis, the airflow guiding duct comprising an entrance portion and a duct sidewall connected to the entrance portion; a retaining portion connected to the duct sidewall, being engaged in the locking hole; the entrance portion covering a portion of the memory card, and the duct sidewall substantially covering a space between the locking component and the power supply bracket, so as to guide airflow; wherein the airflow is configured to flow in the chassis via the first ventilation hole, over the memory card, and then out of the chassis via the second ventilation hole;
wherein the power supply bracket is in communication with an outside of the chassis via the second ventilation hole, to enable the airflow to flow out of the chassis;
a drive bracket is configured for receiving disk drives and secured on the chassis front wall, the locking component is perpendicularly connected to a wall of the drive bracket; and the airflow guiding duct, and the drive bracket and the power supply bracket together define a space for the airflow flowing from the memory card to the second ventilation hole.

2. The computer system of claim 1, wherein a securing component is secured to the drive bracket, the securing component defines a securing hole, and a first hook is located on the airflow guiding duct and engages in the securing hole.

3. The computer system of claim 1, wherein the chassis further comprises a chassis left wall, a flange is located on the chassis left wall, and a positioning tab is located on the airflow guiding duct and engages with the flange.

4. The computer system of claim 3, wherein the flange defines a flange hole, and a second hook is located on the airflow guiding duct and engaged in the flange hole.

5. The computer system of claim 1, wherein the airflow guiding duct comprises a duct top wall substantially perpendicular to the duct sidewall, and the duct top wall substantially covers the power supply bracket and the drive bracket.

6. The computer system of claim 5, wherein the duct sidewall comprises a first vertical wall, a second vertical wall and a third vertical wall; the first vertical wall and the third vertical wall are respectively connected opposite edges of the second vertical wall, the entrance portion is connected to the second vertical wall and comprises an entrance vertical wall and an entrance horizontal wall, the entrance vertical wall is positioned at one side of the memory card, and the entrance horizontal wall is positioned above the memory card.

7. The computer system of claim 6, wherein the entrance vertical wall is parallel to the chassis front wall, the entrance horizontal wall is perpendicular to the chassis front wall, and the entrance horizontal wall is positioned between the entrance vertical wall and the chassis front wall.

8. The computer system of claim 5, wherein the chassis bottom wall defines a screw hole, and a fixing pin extends from the duct sidewall and engages in the screw hole.

9. A computer system comprising:
a chassis comprising a chassis bottom wall, a chassis front wall and a chassis rear wall; the chassis front wall defining a first ventilation hole, and the chassis rear wall defining a second ventilation hole; a drive bracket being secured to the chassis front wall for receiving disk drives; a power supply bracket being secured to the chassis rear wall for receiving a power supply; a motherboard secured to the chassis bottom wall between the chassis front wall and the chassis rear wall; a memory card secured to the motherboard, a locking component perpendicularly connected to a wall of the drive bracket, a locking hole defined in the locking component, a space defined by the locking component, the drive bracket, and the power supply bracket; and
an airflow guiding duct secured in the chassis substantially covers the space, defining a retaining portion engaged in the locking hole, and extending to cover a portion of the memory card, to guide airflow; wherein the airflow is capable of flowing in the chassis via the first ventilation hole, over the memory card, the space and the power supply bracket, and then out of the chassis via the second ventilation hole.

10. The computer system of claim 9, wherein a securing component is secured to the drive bracket; the securing component defines a securing hole; and a first hook is located on the airflow guiding duct and engages in the securing hole.

11. The computer system of claim 10, wherein the chassis further comprises a chassis left wall; a flange is located on the chassis left wall; and a positioning tab is located on the airflow guiding duct and engages with the flange.

12. The computer system of claim 11, wherein the flange defines a flange hole; and a second hook is located on the airflow guiding duct and engaged in the flange hole.

13. The computer system of claim 11, wherein the chassis front wall is substantially perpendicular to the chassis left wall.

14. The computer system of claim 9, wherein the airflow guiding duct comprises a duct top wall and a duct sidewall substantially perpendicular to the duct top wall; and the duct top wall and the duct sidewall abut the power supply bracket, the locking component and the drive bracket.

15. The computer system of claim 14, wherein the duct sidewall comprises a first vertical wall, a second vertical wall and a third vertical wall; the first vertical wall and the third vertical wall are respectively connected opposite edges of the second vertical wall, an entrance portion is connected to the second vertical wall and comprises an entrance vertical wall and an entrance horizontal wall; and the entrance vertical wall is positioned at one side of the memory card, and the entrance horizontal wall is positioned above the memory card.

16. The computer system of claim 15, wherein the entrance vertical wall is parallel to the chassis front wall; the entrance horizontal wall is perpendicular to the chassis front wall; and the entrance horizontal wall is positioned between the entrance vertical wall and the chassis front wall.

17. The computer system of claim 14, wherein the chassis bottom wall defines a screw hole, and a fixing pin extends from the duct sidewall and engages in the screw hole.

18. The computer system of claim 14, wherein the chassis front wall is substantially parallel to the chassis rear wall.

* * * * *